US010006992B2

(12) United States Patent
Hüttner et al.

(10) Patent No.: US 10,006,992 B2
(45) Date of Patent: Jun. 26, 2018

(54) METHOD AND ARRANGEMENT FOR THE RELATIVE POSITION DETECTION OF STATIONS BY MEANS OF RADIO LOCATION

(71) Applicant: Siemens Aktiengesellschaft, Munich (DE)

(72) Inventors: Jörg Hüttner, Hof (DE); Andreas Ziroff, München (DE)

(73) Assignee: Siemens Aktiengesellschaft, Munich (DE)

( * ) Notice: Subject to any disclaimer, the term of this patent is extended or adjusted under 35 U.S.C. 154(b) by 651 days.

(21) Appl. No.: 14/413,060

(22) PCT Filed: Jul. 2, 2013

(86) PCT No.: PCT/EP2013/063879
§ 371 (c)(1),
(2) Date: Jan. 6, 2015

(87) PCT Pub. No.: WO2014/006013
PCT Pub. Date: Jan. 9, 2014

(65) Prior Publication Data
US 2015/0168535 A1    Jun. 18, 2015

(30) Foreign Application Priority Data

Jul. 6, 2012    (DE) .................. 10 2012 211 809

(51) Int. Cl.
*G01S 13/75*    (2006.01)
*G01S 3/48*    (2006.01)
*G01S 13/82*    (2006.01)
*G01S 5/02*    (2010.01)
*G01S 13/02*    (2006.01)

(52) U.S. Cl.
CPC .............. *G01S 13/75* (2013.01); *G01S 3/48* (2013.01); *G01S 5/0284* (2013.01); *G01S 13/02* (2013.01); *G01S 13/758* (2013.01); *G01S 13/82* (2013.01)

(58) Field of Classification Search
CPC ............... G01S 5/0284; G01S 13/02; G01S 13/74–13/758; G01S 3/46–3/50; G01S 13/82–13/84
See application file for complete search history.

(56) References Cited

U.S. PATENT DOCUMENTS 4,075,632 A * 2/1978 Baldwin .............. A01K 29/005
340/870.01
5,361,071 A * 11/1994 van Zon ................ G01S 13/751
342/42

(Continued)

FOREIGN PATENT DOCUMENTS

DE    102006037247 A1    2/2008
DE    102009049978 A1    5/2011

(Continued)

OTHER PUBLICATIONS

Krigslund R. et al; "Potential of RFID Systems to Detect Object Orientation"; ICC 2011—2011 IEEE International Conference on Communications—Jun. 5-9, 2011—Kyoto, Japan, IEEE, Piscataway, NJ; pp. 1-5; ISBN: 978-1-61284-232-5; DOI: 10.1109/ICC.2011.5963421; XP031909146; 2011; US; Jun. 5, 2011.

*Primary Examiner* — Matthew M Barker
(74) *Attorney, Agent, or Firm* — Cozen O'Connor

(57) ABSTRACT

A system and method for determining the relative position of stations through radio location is proposed. In one aspect, a station is configured as an apparatus having at least one antenna. At least one first station has at least one first antenna, and at least one second station has at least two base-modulated antennas. The first station sends at least one (Continued)

locating signal via the first antenna. The second station reflects the locating signal as a first modulated reflected locating signal via a first base-modulated antenna and as a second modulated reflected locating signal via a second base-modulated antenna. The first station receives the modulated reflected locating signals via the antenna. The phase relationships of the received modulated reflected locating signals are used to ascertain at least one position angle for the relative position between the first station and the second station.

13 Claims, 3 Drawing Sheets

(56) References Cited

U.S. PATENT DOCUMENTS

| | | | | |
|---|---|---|---|---|
| 5,564,069 | A * | 10/1996 | Grabow | H04B 7/26 342/51 |
| 6,236,315 | B1 * | 5/2001 | Helms | G06K 7/0008 340/10.1 |
| 7,170,412 | B2 * | 1/2007 | Knox | G01S 3/32 340/572.1 |
| 2001/0010495 | A1 * | 8/2001 | Helms | G06K 7/0008 340/572.7 |
| 2008/0238686 | A1 | 10/2008 | Tuttle | |
| 2009/0002165 | A1 | 1/2009 | Tuttle | |
| 2011/0074633 | A1 | 3/2011 | Besoli | |
| 2011/0156874 | A1 * | 6/2011 | Liu | G06K 7/10346 340/10.1 |

FOREIGN PATENT DOCUMENTS

| | | |
|---|---|---|
| EP | 0567888 A2 | 11/1993 |
| WO | WO 2009086212 A1 | 7/2009 |
| WO | WO 2010009906 A1 | 1/2010 |
| WO | WO 2011047899 A1 | 4/2011 |
| WO | WO 2012012901 A1 | 2/2012 |
| WO | WO 2013050597 A1 | 4/2013 |

\* cited by examiner

METHOD AND ARRANGEMENT FOR THE RELATIVE POSITION DETECTION OF STATIONS BY MEANS OF RADIO LOCATION

CROSS-REFERENCE TO RELATED APPLICATIONS

This is a U.S. national stage of application No. PCT/EP2013/063879, filed on Jul. 2, 103, which claims priority to the German Application No. DE 102012211890.8 filed Jul. 6, 2012, the content of both incorporated herein by reference.

BACKGROUND OF THE INVENTION

1. Field of the Invention

The present application generally relates to a method and an arrangement for ascertaining the relative position of at least two stations by means of radio location.

2. Related Art

Local radio location systems for determining the position of one or more mobile radio modules are widely used today. Methods using radio waves are distinguished by properties such as robustness, accuracy and insensitivity toward interfering and environmental influences.

One example of the application of such a radio location system is the automotive industry. With an eye toward the increasing importance of electromobility, electric vehicles are expected to be able to travel automatically and park with a high level of precision. The inductive charging of such electric vehicles, involves a high level of parking accuracy in order to orient the corresponding charging coils of the charging post and the electric vehicle to one another in a precise manner.

Such coordination involves not only measurement of the intervals between two objects equipped with radio modules, such as the electric vehicle and the charging post, but also determination of the angular position relative to one another. To that end, metrology is used to record the geometric complete relative position in terms of distance and angle. Only then is it possible for a regulatory system to undertake navigation of a vehicle. This is also known as "electronic towbar".

Further opportunities for application arise by way of example in the field of loading bulk goods such as in strip-mining or in agriculture. Conventional radio location systems can obtain position information for a mobile unit from various measurable variables for the wave propagation between the mobile unit and base stations. For Example, these variables may be reception field strength, propagation time, propagation time differences or angle information for the signal arriving at a base station. However, the radio modules in the mobile unit and in the base stations are technically complex and hence expensive in this case.

The EP 0 567 888 A2 reference discloses a communication system for data transmission from a moving vehicle to a fixed beacon that has a transmission and reception device. In this case, a signal is emitted by the beacon and received by an antenna of an onboard appliance of the vehicle and, following modulation with a data signal, returned to the beacon again, where the data are extracted from the returned signal. The onboard appliance has at least two modulators that can be used independently of one another to modulate the received signal with the data signal and to return it in different ways.

SUMMARY OF THE INVENTION

It is an object of the present invention to provide an improved method and arrangement for detecting the relative position of stations through radio location.

Accordingly, a method for ascertaining the relative position of stations through radio location is proposed. In one aspect, a station is configured as an apparatus having at least one antenna. At least one first station has at least one first antenna, and at least one second station has at least two base-modulated antennas. The first station sends at least one locating signal via the first antenna. The second station reflects the locating signal as a first modulated reflected locating signal via a first base-modulated antenna and as a second modulated reflected locating signal via a second base-modulated antenna. The first station receives the modulated reflected locating signals via the antenna. The phase relationships of the received modulated reflected locating signals are used to ascertain at least one position angle for the relative position between the first station and the second station.

A base-modulated antenna is an antenna that has a modulator at its base for modulating a received signal. The phase relationships of the sent and received signals relative to one another can be used to calculate the bearing angle or position angle $\alpha$, $\beta$ of the radio location stations.

In one embodiment, the proposed method allows the hardware and algorithms for producing, transmitting and evaluating the locating signal and the modulated reflected locating signal to be concentrated in the first station, and hence only in one of the two stations. The second station with the base-modulated antennas is simple in design and can be produced inexpensively in comparison with an active transmission and reception antenna. An application such as the exact actuation of charging stations by electric vehicles, can therefore be implemented inexpensively, even in large numbers. That is because the elaborate hardware and algorithms may be in place in the charging station, while the electric vehicles are merely equipped with the inexpensive, passive stations with base-modulated antennas.

In the various embodiments, the base-modulated antennas reflect different modulations of the locating signal. Such modulation provides for relatively simple separation of the modulated reflected locating signals received at the first station and hence allows information to be obtained about distance, and propagation time phase for the second station, even in the case of reflected locating signals that are simultaneously modulated by the base-modulated antennas of the second station.

In further embodiments, the first station has a second antenna. The first station sends the locating signal via the first and the second antenna at different frequencies or with different modulations, using orthogonal signals. Such signaling allows separation of the modulated reflected locating signals received at the first station according to frequencies or transmission channels or modulations, and also allows the use of further first stations for sending the locating signal on different, separable channels. The use of orthogonal modulations at the first station is advantageous in this case because the modulated reflected locating signals can then also be separated particularly well. As used herein, the term "orthogonally modulated" relates to the ratio of a sent locating signal to other sent locating signals.

In further embodiments, the second station is configured as a backscatter module for modulated backscatter of the locating signal. Impedance changes at the base-modulated antennas of the second station cause a backscatter effect for a portion of the arriving electromagnetic wave. For example, if the impedance change is switched on and off by a switch, an amplitude-modulated signal is produced that can be picked up by the antenna of the first station. This means that the second station itself does not need to expend any transmission power of its own. Such backscatter modules allow ranges of up to 100 meters.

In further embodiments, the second station is configured as a Passive RFID transponder. RFID transponders or RFID tags are available very inexpensively in large numbers.

In further embodiments, the base-modulated antennas of the at least one second station are arranged in a line at constant intervals.

In further embodiments, the antennas of the at least one first station are arranged in a line at constant intervals. The linear arrangement of the antennas at constant intervals allows simple and efficient determination of the at least one position angle.

In further embodiments, a continuous-wave radar signal is used as the locating signal. Continuous-wave radar signals or FMCW signals (FMCW; Frequency Modulated Continuous Wave) allow particularly accurate measurements.

In further embodiments, a frequency ramp is used as the locating signal. For example, the use of a frequency ramp as the locating signal may be advantageous particularly in the case of sequential sending of locating signals, if the first station has a plurality of antennas or if a plurality of first stations send locating signals.

In further embodiments, the modulated reflected locating signals received by the at least one first station and the modulated reflected locating signals sent by the at least one second station are coherent. The at least one position angle is calculated from the phase relationships of the sent modulated reflected locating signals and the received modulated reflected locating signals.

In further embodiments, the at least one first station sends a separate synchronization signal for the purpose of synchronizing the at least one first station to the at least one second station. For example, this allows synchronization to the second station when the first station has a plurality of antennas and sends a plurality of locating signals sequentially, or when a plurality of first stations send a plurality of locating signals sequentially.

In further embodiments, signal propagation times of the locating signals are used for measuring the interval between the stations. In addition, an arrangement for ascertaining the relative position of stations through radio location is Proposed. At least one first station has at least one first antenna, and at least one second station has at least two base-modulated antennas. The first station is configured to send at least one locating signal via the first antenna. The second station is configured to reflect the locating signal in modulated form as a first modulated reflected locating signal via the first base-modulated antenna and as a second modulated reflected locating signal via the second base-modulated antenna. The first station is additionally configured to receive the modulated reflected locating signals via the antenna and to use the phase relationships of the modulated reflected locating signals to ascertain at least one position angle for the relative position between the first station and the second station.

BRIEF DESCRIPTION OF THE DRAWINGS

The properties, features and advantages that are described above and also the manner in which they are achieved will become clearer and more distinctly comprehensible in connection with the description that follows for the exemplary embodiments, which are explained in more detail in connection with the drawings, in which.

In the figures, elements that are the same or have the same function have been provided with the same reference symbols, unless stated otherwise.

DETAILED DESCRIPTION OF THE PRESENTLY PREFERRED EMBODIMENTS

Figure 1:
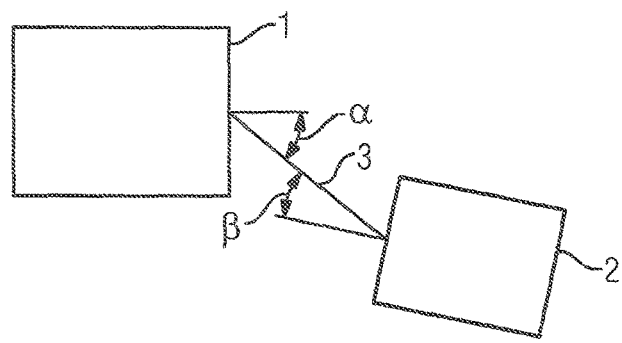
FIG. 1 shows an exemplary embodiment of angle and interval measurement between two stations through radio location.

FIG. 1 shows an exemplary embodiment of angle and interval measurement between two stations 1, 2 by means of radio location. It shows the position of two stations 1, 2 in relation to one another. The position angles $\alpha$, $\beta$ are indicated relative to a line of sight 3. If the first station has precisely one antenna, it is possible to determine the position angle $\beta$. If the first station has two or more antennas, it is possible to determine both position angles $\alpha$, $\beta$.

Figure 2:
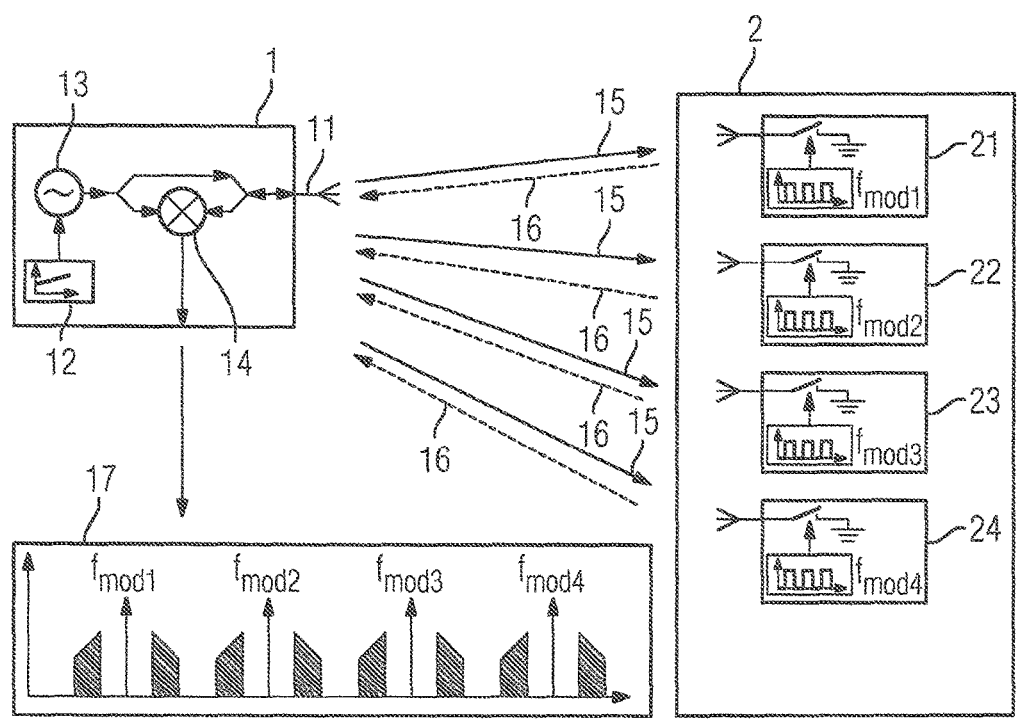
FIG. 2 shows an exemplary embodiment of an arrangement for detecting the relative position of stations through radio location.

FIG. 2 shows an exemplary embodiment of an arrangement for detecting the relative position of the stations 1, 2 through radio location. It shows a first station 1 having an antenna 11. In addition, a switch 12, an AC supply 13 and an evaluation unit 14 are shown for the first station 1 in symbol form, so that the first station 1 is a full, active transmission and reception station with its own power supply 13 and complex hardware equipment. In addition, a second station 2 is shown. The second station 2 has four base-modulated antennas 21, 22, 23, 24.

The first station 1 sends a locating signal 15 via the antenna 11. The second station 2 reflects the locating signal 15 as modulated reflected locating signal 16 via the base-modulated antennas 21, 22, 23, 24. In this example, each of the base-modulated antennas 21, 22, 23, 24 has a modulator (e.g., in the form of an on/off switch), which modulates the received locating signal 15 at the base of the antenna in accordance with a modulation $f_{mod1}$, $f_{mod2}$, $f_{mod3}$, $f_{mod4}$, so that the modulated reflected locating signal 16 can be explicitly associated with the individual base-modulated antennas 21, 22, 23, 24 of the second station 2 upon reception at the first station 1.

The second station 2 and the base-modulated antennas 21, 22, 23, 24 of the second station may be configured as passive RFID transponders, for example, which draw power from the locating signal 15.

The first station 1 receives the modulated reflected locating signals 16 via the antenna 11. In the evaluation unit 14, the phase relationships of the received modulated reflected locating signals 16 are used to ascertain at least one position angle $\alpha$, $\beta$ for the relative position between the first station 1 and the second station 2.

By way of example, the evaluation unit 14 comprises a synthesizer that sends the locating signal 15 via the antenna 11 as a frequency-modulated continuous-wave signal. In addition, the evaluation unit 14 comprises a mixer that mixes the sent locating signal 15 with the modulated reflected locating signals 16 received the antenna 11. The reflected locating signals 16 modulated by the base-modulated antennas 21, 22, 23, 24 produce a mixed signal in the evaluation unit 14 with frequency components 17 in the region of the respective modulation frequency $f_{mod1}, f_{mod2}, f_{mod3}, f_{mod4}$ of the base-modulated antennas 21, 22, 23, 24.

These frequency components 17 contain information about the distance between the first station 1 and the second station 2, which is ascertained by suitable signal processing by the evaluation unit 14. In addition, the mixed signal contains information about the propagation time phase of the locating signals 15 and of the modulated reflected locating signals 16 between the first station 1 and the second station 2.

Figure 3:
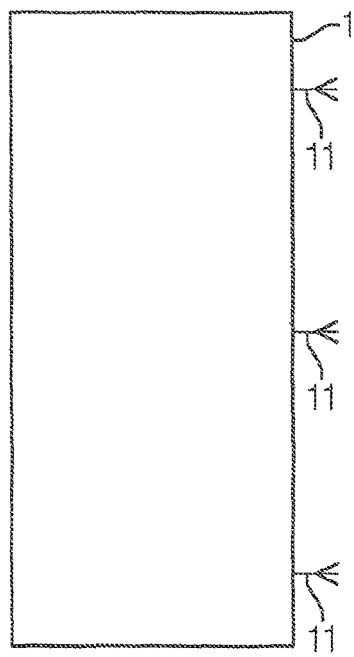
FIG. 3 shows a further exemplary embodiment of an arrangement for detecting the relative position of stations through radio location.
Figure 3:
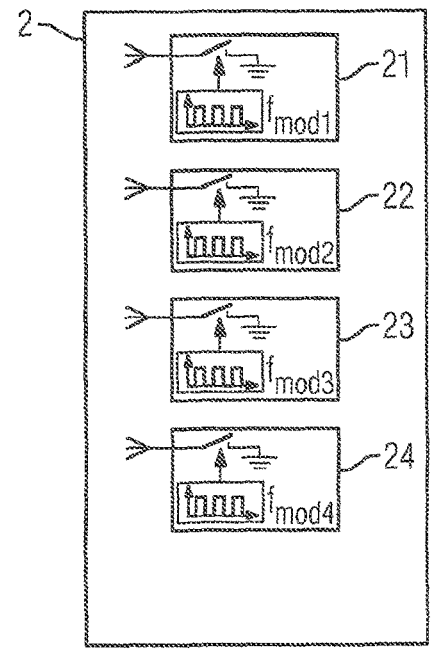

FIG. 3 shows a further exemplary embodiment of an arrangement for detecting the relative position of the stations 1, 2 by radio location. In this exemplary embodiment, the arrangement comprises a first station 1 having three antennas 11. For the sake of clarity, the switch 12, the AC supply 13 and the evaluation unit 14 for the first station 1 are not shown in FIG. 3.

The second station 2 has four base-modulated antennas 21, 22, 23, 24. The first station 1 sends via each of the three antennas 11 using different frequencies or channels or using different modulations.

Figure 4:
FIG. 4 shows a further exemplary embodiment of an arrangement for detecting the relative position of stations through radio location.
Figure 4:
Figure 4:
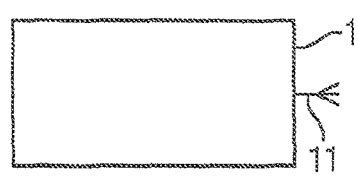
Figure 4:
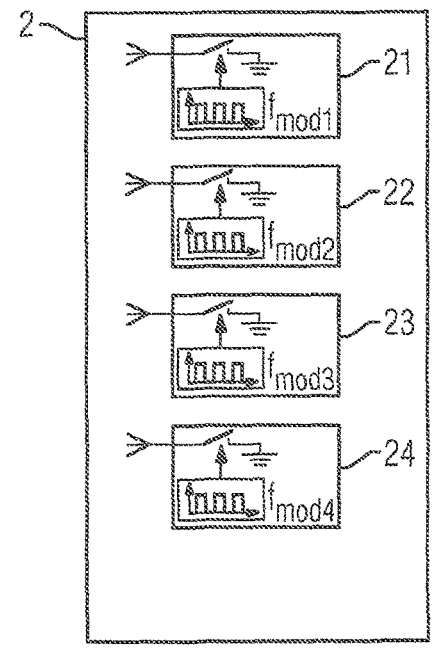

FIG. 4 shows that it is also possible to use a plurality of first stations 1 each having one or more antennas 11 for sending the locating signal 15.

Figure 5:
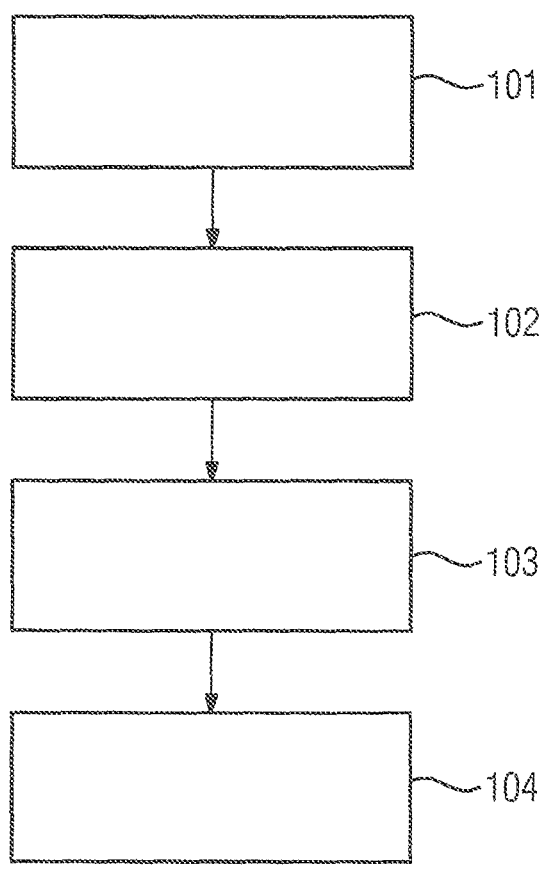
FIG. 5, shows a block diagram of a method for detecting the relative position of stations through radio location.

FIG. 5 shows a block diagram of a method for detecting the relative position of the stations 1, 2 by means of radio location.

In step 101, the first station 1 sends a locating signal 15 via the first antenna 11. In step 102, the second station 2 reflects the locating signal 15 as modulated reflected locating signals 16 via the base-modulated antennas 21-24. In step 103, the first station 1 receives the modulated reflected locating signals 16 via the antenna 11. In step 104, the phase relationships of the received modulated reflected locating signals 16 are used to ascertain at least one position angle α, β for the relative position between the first station 1 and the second station 2.

The proposed method and the proposed arrangement for detecting the relative position of stations by radio location allow a whole series of base-modulated antennas to be polled simultaneously and the phase relationships between the base-modulated antennas to be evaluated, for example, to perform angle measurement.

To this end, when the base-modulated antennas are in a linear arrangement, the phase relationships of the response signals produced by them, (i.e., the modulated reflected locating signals), likewise follow a linear correlation. The linear correlation can be used to infer the angle of the second station relative to the reading unit (i.e., relative to the first station).

If a plurality of or multichannel reading units or first stations in a linear arrangement are used, the different modulated reflected received signals from a given base-modulated antenna are likewise different and therefore allow inferences as to the angle of the reading units or of the first stations in relation to the given base-modulated antenna of the respective second station.

A further advantageous property of the proposed arrangement with a plurality of reading units or first stations and a plurality of base-modulated antennas of a second station is the potential increase in the range and in the robustness as a result of suitable offsetting of the signals. For example, this is made possible through knowledge of the propagation time phases, which allows the use of particular methods of digital beam control. This allows multipath effects to be hidden, for example, so that measurement accuracy can be increased.

In addition, superimposition of the total of n*m individual signals (with n: number of reading channels or locating signals and m: number of base-modulated antennas) in the correct phase allows an increase in the signal-to-noise ratio to be achieved that can significantly extend the range of corresponding systems.

The proposed method and the proposed arrangement provide highly asymmetric systems that concentrate a large portion of the functionality in terms of hardware and algorithm in the reading portion (i.e., in the first station).

By contrast, the second station, which contains the base-modulated antennas, may be of very simple and inexpensive design, for example using RFID tags. This allows the proposed system concept to be used for a large number of applications.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for ascertaining the relative position of stations by radio location, at least one first station including at least one first antenna and at least one second station including at least two base-modulated antennas, the method comprising:
   sending by the at least one first station at least one locating signal via the at least one first antenna;
   reflecting by the at least one second station the at least one locating signal in modulated form as a first modulated reflected locating signal via a first base-modulated antenna of the at least two base-modulated antennas and as a second modulated reflected locating signal via a second base-modulated antenna of the at least two base-modulated antennas;
   receiving by the at least one first station the modulated reflected locating signals via the at least one first antenna; and
   determining at least one position angle for a relative position between the at least one first and second stations from phase relationships between the received modulated reflected locating signals.

2. The method of claim 1, wherein the at least two base-modulated antennas reflect the locating signal at different modulation frequencies.

3. The method of claim 1, wherein the at least one first station includes a second antenna; and wherein the at least one first station sends the locating signal via the at least one first and second antennas at different frequencies or with different modulations using orthogonal signals.

4. The method of claim 1, wherein the at least one second station is configured as a backscatter module that modulates backscatter of the locating signal.

5. The method of claim 4, wherein the at least one second station is configured as a passive RFID transponder.

6. The method of claim 1, further comprising:
arranging the at least two base-modulated antennas of the at least one second station in a line at spaced apart, constant intervals.

7. The method of claim 1, further comprising:
arranging antennas of the at least one first station in a line at spaced apart, constant intervals.

8. The method of claim 1, wherein the locating signal is a continuous-wave radar signal.

9. The method of claim 1, wherein the locating signal is a frequency ramp.

10. The method of claim 1, wherein the modulated reflected locating signals received by the at least one first station and the modulated reflected locating signals sent by the at least one second station are coherent; and
wherein the at least one position angle is calculated from the phase relationships between sent modulated reflected locating signals and the received modulated reflected locating signals.

11. The method of claim 1, further comprising:
sending a separate synchronization signal by the at least one first station to synchronize the at least one first station to the at least one second station.

12. The method of claim 1, further comprising:
measuring an interval between the at least one first and second stations through signal propagation times of the received modulated reflected locating signals.

13. An arrangement configured to determine the relative position of stations by radio location, comprising:
at least one first station including at least one first antenna; and
at least one second station including at least two base-modulated antennas;
wherein the at least one first station is configured to send at least one locating signal via the at least one first antenna;
wherein the at least one second station is configured to reflect the at least one locating signal in modulated form as a first modulated reflected locating signal via a first base-modulated antenna of the at least two base-modulated antennas and as a second modulated reflected locating signal via a second base-modulated antenna of the at least two base-modulated antennas; and
wherein the at least one first station is further configured to receive modulated reflected locating signals via the at least one first antenna and configured to utilize phase relationships between the modulated reflected locating signals to determine at least one position angle for a relative position between the at least one first and second stations.

* * * * *